(12) United States Patent
Quoc et al.

(10) Patent No.: US 6,243,826 B1
(45) Date of Patent: *Jun. 5, 2001

(54) REDUNDANT NETWORK MANAGEMENT SYSTEM FOR A STAKABLE FAST ETHERNET REPEATER

(75) Inventors: Tuyen V. Quoc, Saratoga; Alan P. Liebthal, Los Gatos, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/604,288

(22) Filed: Jun. 22, 2000

Related U.S. Application Data

(63) Continuation of application No. 08/964,602, filed on Nov. 6, 1997, now Pat. No. 6,092,214.
(60) Provisional application No. 60/058,611, filed on Sep. 10, 1997, and provisional application No. 60/062,391, filed on Oct. 7, 1997.

(51) Int. Cl.[7] .............................. H04L 25/20; H04J 3/14

(52) U.S. Cl. .............................. 714/4; 709/209; 370/445

(58) Field of Search .................. 714/4, 713; 709/208, 709/220, 221, 209, 211, 223; 370/447, 445

(56) References Cited

U.S. PATENT DOCUMENTS

| | | | |
|---|---|---|---|
| 4,939,752 | 7/1990 | Literati et al. | 714/4 |
| 4,967,344 | 10/1990 | Scavezze et al. | 714/4 |
| 5,461,608 | 10/1995 | Yoshiyama | 370/222 |

(List continued on next page.)

OTHER PUBLICATIONS

"Bridge Management Module Installation and Configuration Guide" Chapter 1, Cisco archives, pp. 1.1–1.14, Oct. 1997.*
"Fasthub 300 Series 100BaseT Repeaters" Cisco archives, pp. 1–8, Oct. 1997.*
Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7–14 (1995).
International Standard ISO/IEC 8802–3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125–155.

Primary Examiner—Norman M. Wright
Assistant Examiner—Christopher Revak
(74) Attorney, Agent, or Firm—Van Pelt & Yi LLP

(57) ABSTRACT

Provided is a redundant network management system. Several network management modules (NMMs), preferably one for each repeater unit, are provided in a single repeater stack. The NMMs of the repeater stack communicate using a management bus. The modules communicate on the management bus by sending small messages, referred to as "frames." In a preferred embodiment, the present invention is preferably used in conjunction with a relatively simple and economical 8-bit management bus. This low cost implementation allows only one NMM to access the bus at any given time, and makes use of protocols by which multiple NMMs may use the management bus to communicate while ensuring that no two modules attempt to use the bus at the same time. Moreover, according to the present invention, only one NMM (referred to as the "master") will perform all of the network management functions for the stack at any one time. The remaining modules operate in "slave" mode. When in slave mode, the modules are on stand-by, ready to take the role of master if necessary. This master/slave relationship provides a level of fault tolerance and redundancy to the user in a seamless manner, thereby improving network performance and reliability.

45 Claims, 7 Drawing Sheets

U.S. PATENT DOCUMENTS

| | | | |
|---|---|---|---|
| 5,629,685 | 5/1997 | Allen et al. | 370/462 |
| 5,636,214 | 6/1997 | Kranzler et al. | 370/445 |
| 5,696,896 | 12/1997 | Badovinatz et al. | 714/4 |
| 5,699,501 | 12/1997 | Badovinatz et al. | 714/4 |
| 5,704,032 | 12/1997 | Badovinatz et al. | 714/4 |
| 5,805,596 | 8/1998 | Kranzler et al. | 370/445 |
| 5,870,301 | 2/1999 | Yakushii et al. | 700/3 |

* cited by examiner

REDUNDANT NETWORK MANAGEMENT SYSTEM FOR A STAKABLE FAST ETHERNET REPEATER

CROSS REFERENCE TO RELATED APPLICATIONS

This application is a continuation of U.S. patent application Ser. No. 08/964,602, filed Nov. 6, 1997, which is now U.S. Pat. No. 6,092,214 which claims priority to U.S. Provisional Patent Application No. 60/058,611, filed Sep. 10, 1997 and U.S. Provisional Patent Application No. 60/062,391, filed Oct. 7, 1997.

This application is related to co-pending U.S. patent application Ser. Nos. 08/965,479, 08/965,330, 08/965,320, 08/965,460, and 08/965,323, which are incorporated herein by reference for all purposes.

BACKGROUND OF THE INVENTION

This invention relates generally to network computing, and in particular to the management of Ethernet repeaters. More specifically, the invention relates to a network management system for a stackable Fast Ethernet repeater.

The growth of local-area networks (LANs) has been driven by the introduction of Ethernet technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabits per second (Mbps). Moreover, with more applications requiring faster LAN speeds for acceptable performance, network managers increasingly find that high-performance computation platforms and mission-critical applications can overwhelm a 10 Mbps network. Network managers therefore are increasingly are implementing high-speed LAN technology.

Fast Ethernet

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the Fast Ethernet Alliance. The charter of the group was to draft the 802.3 u 100BaseT specification of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: To maintain the Ethernet transmission protocol Carrier Sense Multiple Access Collision Detection (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

Other high-speed technologies, such as 100VG-AnyLAN and Asynchronous Transfer Mode (ATM), achieve data rates in excess of 100 Mbps by implementing different protocols that require translation when data moves to and from 10BaseT. Protocol translation requires changing the frame, which often causes delays in frame transmission through layer 2 (data-link layer) LAN switches. Data can move between Ethernet and Fast Ethernet, on the other hand, without requiring protocol translation or software changes, because Fast Ethernet maintains the 10BaseT error control functions as well as the frame format and length.

In many cases, organizations can upgrade to 100BaseT technology without replacing existing wiring. Options for 100BaseT media are the same as those for 10BaseT. They include shielded and unshielded twisted pair (STP and UTP) and fiber. The Media Independent Interface (MII) provides a single interface that can support external transceivers for any of the 100BaseT physical sublayers.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

FIG. 1 depicts a carrier sense-collision detection LAN. Network devices 102, 104, 106, and 108 are attached to a network bus 110. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network device 102 or 104 could transmit its traffic even if network device 108 had already seized the channel after detecting that the channel was idle. This problem is called the collision window. The collision window is a factor of the propagation delay of the signal and the distance between two competing stations. Propagation delay is the delay that occurs before a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer.

Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, it order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet signal speed increases tenfold, from 10 Mbps to 100 Mbps. Therefore, the propagation delay for each part of the network, also referred to as the part's "latency," must be reduced if the 64 byte 802.3 specification collision detection standard is to be satisfied. Latency is typically expressed in terms of bit time, or the amount of data that could be transmitted on the network during the period which it takes a signal to propagate through a network device.

Repeaters

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging-in network devices included in an Ethernet network, hence the term "hub." The Ethernet repeater receives messages from the network devices that are plugged into it and broadcasts (or "repeats") the message to all of the other devices on the network along a network bus, if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 ethernet network might broadcast complete frames of data before being notified of a collision. As described above, the broadcast of complete frames when a collision occurs would defeat a scheme for discarding data associated with collisions by simply discarding all partial frames.

Thus, minimizing the latency of a repeater is critical if the repeater is to be implemented on a network in accordance with the 802.3 specification. The 100BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

Network Flexibility

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting size of the network and the latency of the two repeaters, it is ensured that collisions can be detected and devices connected to different repeaters can be notified of collisions in time to stop sending data before a complete frame is broadcast, in accordance with the 802.3 specification.

Because networks tend to constantly change and expand with network devices being added, it would be highly advantageous if, in addition to the Class II feature of allowing two repeaters in a collision domain, it were also possible that each of the two repeaters were expandable or stackable. Additional ports could be added to a first repeater stack that functions as one Class II repeater and then a second stack could be included as the second Class II repeater. Thus, stackability combined with cascadability would provide even greater flexibility for network expansion.

When a stack of repeaters is provided on a common bus so that they function as a single repeater, it is necessary to have a network management module to manage the stack. The failure of such a network management module managing the stack could potentially remove all of the repeaters in the stack from service. Therefore it would be desirable if multiple network management modules could be provided in a stack together with a scheme for electing a primary network management module, and a backup network management module in the event of a failure of the primary module. Moreover, the reliability and flexibility of the network would be improved if the network management system could automatically detect the failure or absence of the primary module and elect a backup module to perform the system management function without substantial disruption of network operation.

SUMMARY OF THE INVENTION

To achieve the foregoing, the present invention provides a redundant network management system. Several network management modules (NMMs), preferably one for each repeater unit, are provided in a single repeater stack. The NMMs of the repeater stack communicate using a management bus. The modules communicate on the management bus by sending small messages, referred to as "frames." In a preferred embodiment, the present invention is preferably used in conjunction with a relatively simple and economical 8-bit management bus. This low cost implementation allows only one NMM to access the bus at any given time, and makes use of protocols by which multiple NMMs may use the management bus to communicate while ensuring that no two modules attempt to use the bus at the same time. Moreover, according to the present invention, only one NMM (referred to as the "master") will perform all of the network management functions for the stack at any one time. The remaining modules operate in "slave" mode. When in slave mode, the modules are on standby, ready to take the role of master if necessary. This master/slave relationship provides a level of fault tolerance and redundancy to the user in a seamless manner, thereby improving network performance and reliability.

It should be appreciated that the present invention can be implemented in numerous ways, including as a process, an apparatus, a system, a device, a method, or a computer readable medium. Several inventive embodiments of the present invention are described below.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENT

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
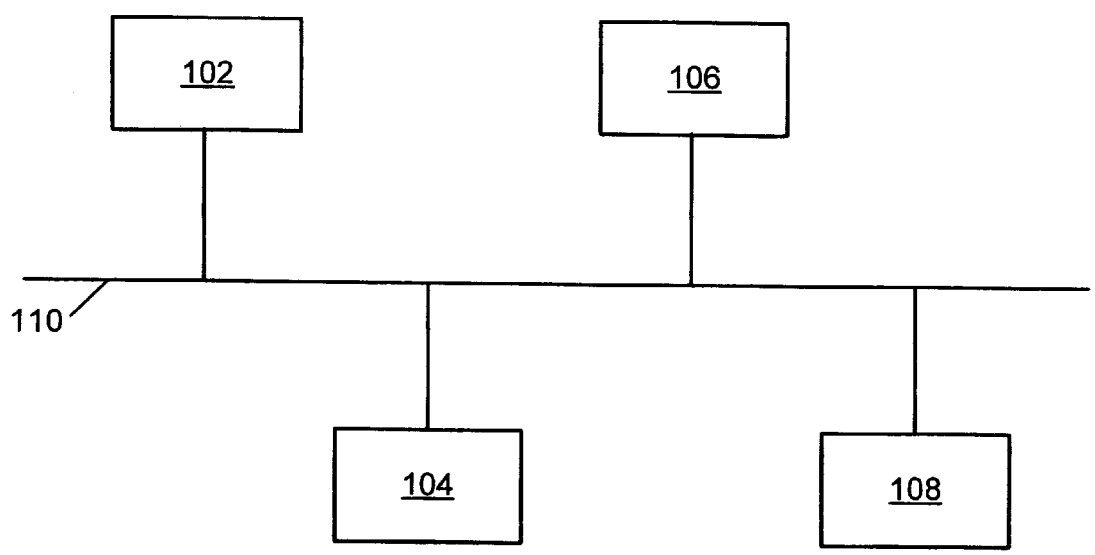
FIG. 1 depicts a carrier sense-collision detection local area network.
Figure 2:
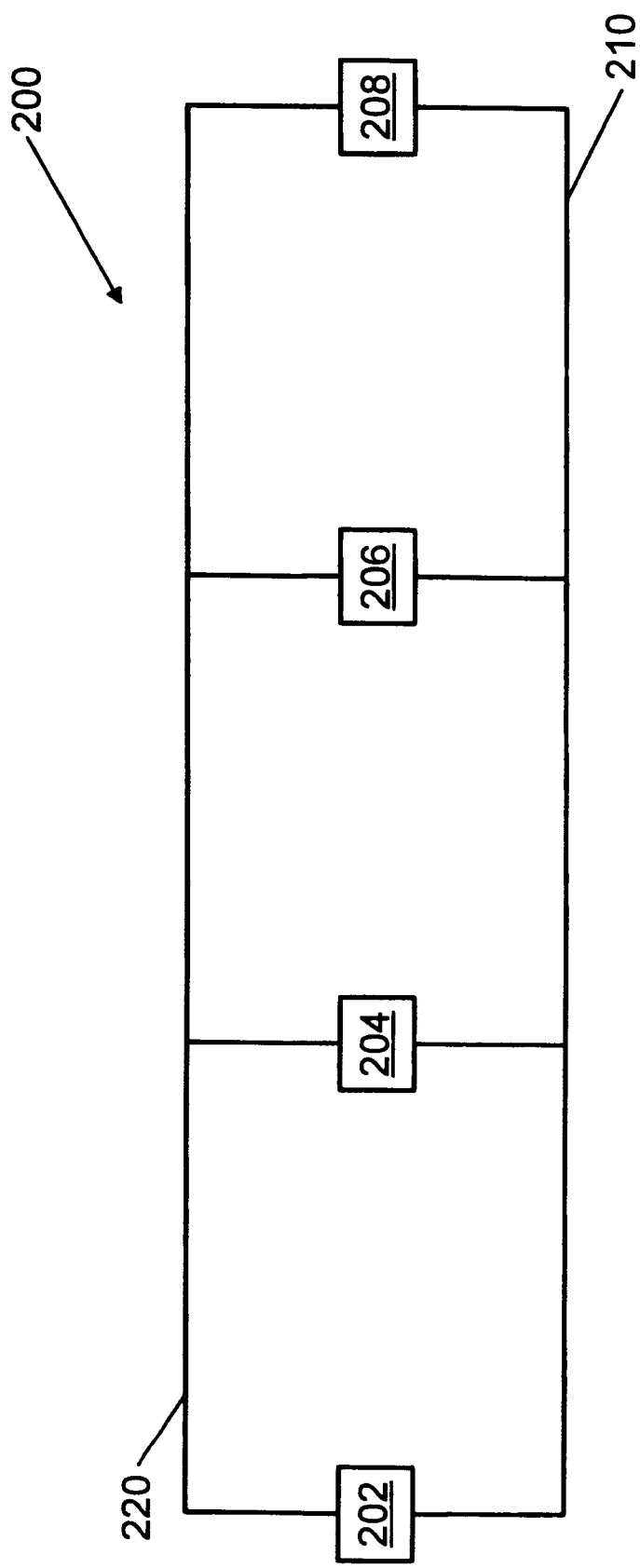
FIG. 2 depicts a preferred stacked repeater structure with which the present invention may be implemented.

The present invention provides a redundant network management system for a stackable Fast Ethernet repeater. One example of such a repeater is described in co-pending U.S. patent application Ser. No. 08/965,479, entitled Synchronous Stack Bus For Fast Ethernet Repeater, which has been previously incorporated by reference herein for all purposes. FIG. 2 illustrates a general structure for a repeater stack with which the present invention may be implemented. In should be understood that these structures are merely exemplary of those with which the management system of the present invention may be implemented. Many other possible platforms are also possible.

In a preferred embodiment, network management modules (NMMs), preferably one for each repeater unit, may be provided in a single repeater stack. FIG. 2 shows a repeater stack 200 having four NMMs 202, 204, 206 and 208. The modules 202, 204, 206 and 208 of the repeater stack 200 communicate using a management bus 210. The modules communicate on the management bus 210 by sending small messages, referred to as "frames." The modules are also connected to a stack bus 220 which provides the main pathway for data transmission between repeaters and other nodes on the network (not shown).

The present invention is preferably used in conjunction with a relatively simple and economical 8-bit management bus. This low cost implementation allows only one NMM to access the bus at any given time, and makes use of protocols by which multiple NMMs may use the management bus to communicate while ensuring that no two modules attempt to use the bus at the same time. To accomplish this, only one NMM (referred to as the "master") will perform all of the network management functions for the stack at any one time. The remaining modules operate in "slave" mode. When in slave mode, the modules are on stand-by, ready to take the role of master if necessary. This master/slave relationship provides a level of fault tolerance and redundancy to the user in a seamless manner, thereby improving network operation and reliability.

According to a preferred embodiment of the present invention, there are five modes in which a management module can be operating at any one time: Initialization, Contention, Contention Master, Selection Master, and Slave. These five modes of operation are represented in FIG. 3, which is a state diagram of a redundant network management system according to a preferred embodiment of the present invention.

Figure 3:
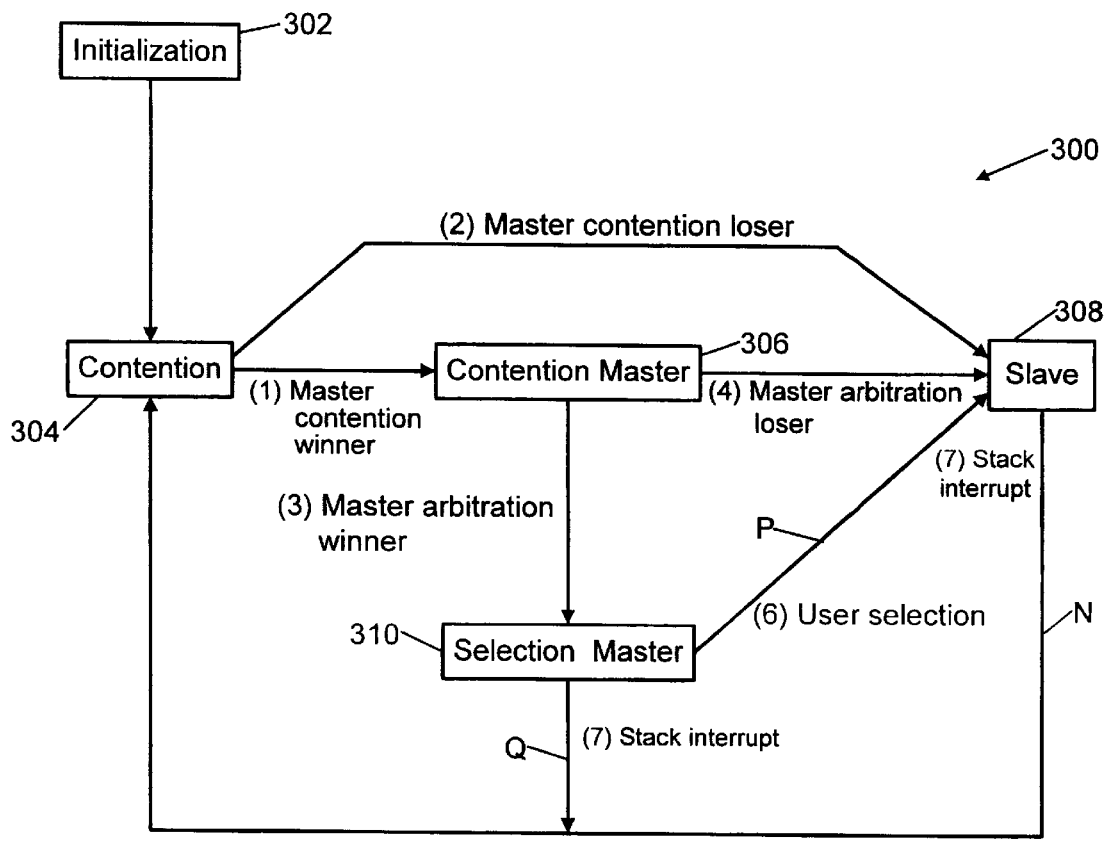
FIG. 3 depicts a state diagram of a redundant network management system according to a preferred embodiment of the present invention.

When a module is first activated due to a power on or software reset event, it is in Initialization mode, represented by Initialization state 302 in FIG. 3. No intermodule communication takes place while the module is in this mode. Once initialization is complete, the module enters Contention mode, represented by Contention state 304 in FIG. 3, in which an initial determination of master and slave roles for each NMM is made. An active module may also transition to Contention mode from a state other than Initialization in the event of a change in the stack configuration. An event causing such a transition may be referred to as a "stack interrupt."

Figure 4:
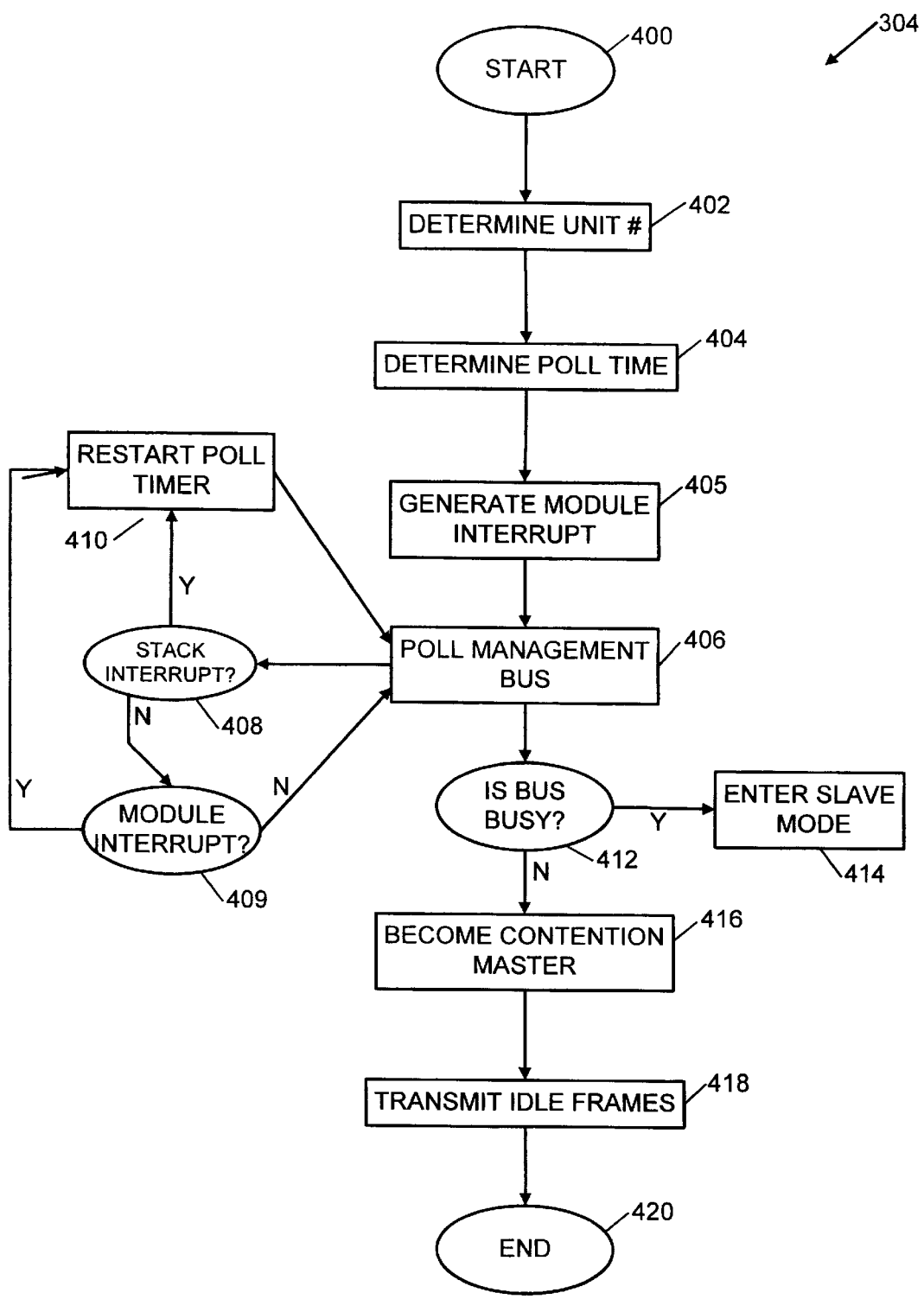
FIG. 4 depicts a process flow chart of a preferred embodiment of the Contention mode represented by the Contention state of FIG. 3.

The Contention state 304 is illustrated in more detail in a process flow depicted in FIG. 4. Due to the limitations imposed by the management bus hardware, described above, effective (i.e., collision free) communication dictates that only one module at a time perform the network management functions. In order for this determination to be made efficiently, a provisional order is established in which one of the modules becomes master and the rest slaves. Thereafter, the provisional master ("Contention Master") controls the management bus during a period of polling of the other modules for specific selection criteria to determine which should be the ultimate master ("Selection Master").

Following initialization or a stack interrupt, each management module participates in a master Contention process. The Contention process 304 begins at 400, and at a step 402 a unit number for each module is determined. The unit number is an integer value based on a module's position in the stack and is unique to that module. For example, the units may be numbered consecutively starting from the top of the stack.

At a step 404, a unique poll time for each module is determined by multiplying each unit number by a time constant. The poll time is that period of time which the module will spend polling the management bus for activity by other modules. A module interrupt is then generated by the NMM software at a step 405. The module interrupt is detected by all NMMs in the stack and serves as a synchronization mechanism for the Contention process. The modules then begin to poll the management bus for activity at a step 406. During the polling step 406, the modules remain sensitive to stack interrupts, such as the addition or removal of new repeater units, as well as module interrupts. If a stack interrupt is detected at a step 408, or if a module interrupt is detected at a step 409, the module's poll timer is reset at a step 410 and the polling of the management bus is recommenced. This allows modules to synchronize the start of the Contention process after coming out of initialization at different times.

If any activity is seen on the bus during a polling step 406 before the poll time has expired, decision step 412 will be answered in the affirmative, and the module will enter Slave mode at a step 414. In Slave mode, a module operates in passive manner, monitoring the management bus and responding to various events that require action by a slave module, described in more detail below with reference to FIG. 6.

If the poll time expires without any activity having been seen on the bus during a polling step 406, the module "wins" the Contention and becomes the Contention Master at a step 416. The Contention Master will immediately begin to generate management activity by transmitting frames, sometimes referred to as "idle frames," to indicate to the other modules that the generating module is operating as the master at a step 418. The Contention ends at 420.

As shown in state diagram 300 in FIG. 3, the states resulting from the Contention are the Contention Master state 306 and the Slave state 308. As described above, the losers of the Contention enter the Slave state 308, while the winner becomes the Contention Master. The details of Contention Master mode 306 are illustrated in a process flow in FIG. 5.

Figure 5:
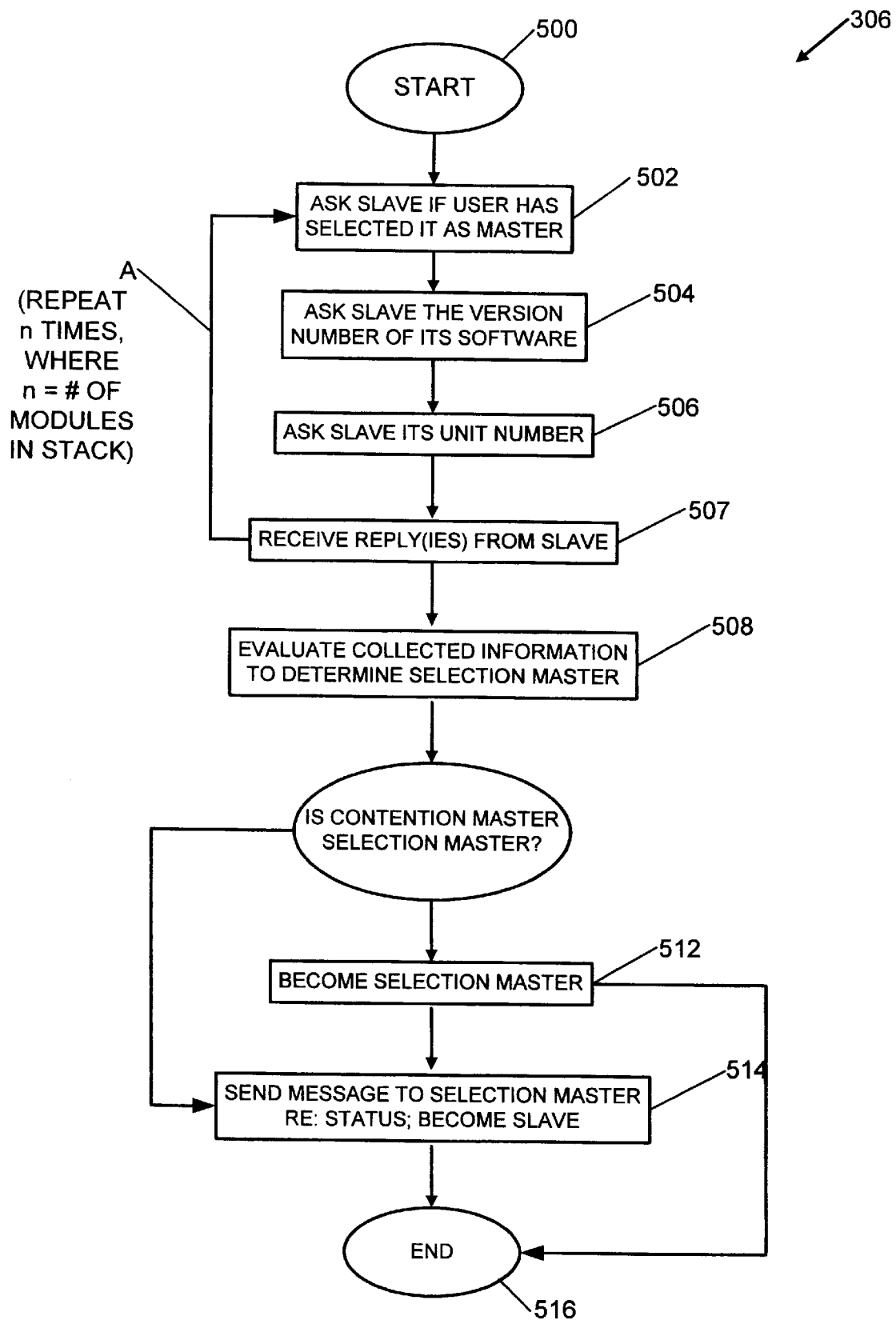
FIG. 5 depicts a process flow chart of a preferred embodiment of the Contention Master mode represented by the Contention Master state of FIG. 3.

Following conclusion of the Contention, the Contention Master initiates a master arbitration process to select the proper master to perform the network management functions (the "Selection Master"). As shown in FIG. 5, Contention Master mode 306 begins at 500, and at a step 502 the Contention Master sends a master selection arbitration query to each slave in the stack. In a preferred embodiment, the master selection is based on a prioritized list of criteria. Highest in the selection criteria hierarchy is user selection of a particular module as master ("User Selection"). Next is the version of software being run by a module, with the most recent version given priority. If neither of the first two criteria result in the determination of the Selection Master, the unit number, an integer value based on a module's position in the stack, may be used to make the selection.

The query is represented in FIG. 5, as three steps. At a step 502, the Contention Master asks a slave (by sending a query frame on the management bus) if it has been selected by a user as master. At a step 504, the Contention Master asks the slave for the version number of its software. And at a step 506, the Contention Master asks the slave its unit number. Each of these queries may be combined into a single query frame or may be sent as individual frames. The slave modules then respond and the master receives the requested information in one or more reply frames at a step 507.

In order to avoid data collisions on the management bus, this query process is carried out one module at a time. The Contention Master waits for a fixed time period (e.g., 10 ms) following transmission of the query frame(s). A slave receiving a query frame(s) will know that it has implicit permission from the Contention Master to transmit a reply frame(s) over the management bus during this time period.

This query/reply process is repeated for each module in the stack, as represented by the loop arrow A linking step 207 to 202. Once each slave has been queried and its response received, at a step 508 the Contention Master evaluates the information received, compares it to its own relevant selection data, and determines the arbitration winner, i.e., which module should be the Selection Master for the stack. If the Contention Master is the Selection Master, the response to decision step 510 will be affirmative, and the Contention Master's status is adjusted to Selection Master at a step 512. If the Contention Master is not the Selection Master, the response to decision step 510 will be negative, and at a step 514, the Contention Master sends a message frame to the Selection Master informing it of its new status, and becomes a slave. Contention Master mode is completed at 516.

Figure 6:
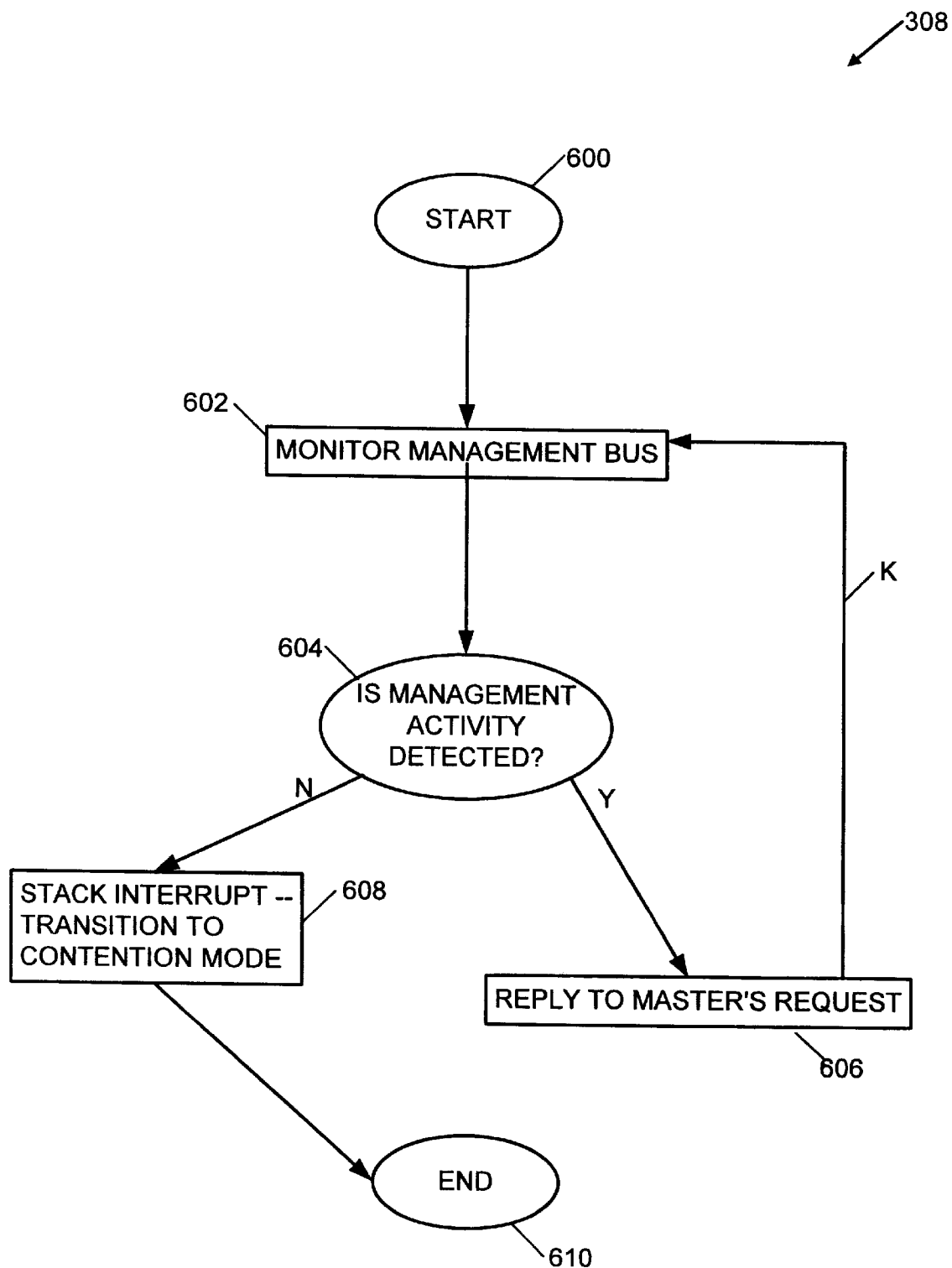
FIG. 6 depicts a process flow chart of a preferred embodiment of the Slave mode represented by the Slave state of FIG. 3.

As noted above, a module that is operating in Slave mode, represented by state 308 in FIG. 3, operates in a passive manner, performing only a few basic tasks. As illustrated in FIG. 6, Slave mode begins at 600, and at a step 602, a slave continuously monitors the management bus for requests from the master or an opportunity to switch to management mode if it has determined that the current master has ceased to operate. In a preferred embodiment, both of these tasks are accomplished using a single timer routine which polls the management bus at regular intervals and processes all packets seen on the bus during its poll time. A slave's poll time may be determined as described above with respect to the Contention process.

If the Slave detects management activity during its poll time, the decision step 604 will be answered in the affirmative and the module replies to requests from the master management module, including requests to harmonize its configuration with that of the master. Once the master's request has been complied with, the slave resumes monitoring the bus, as indicated by arrow K of FIG. 6.

If at some point the routine does not detect any activity by the master during the module's poll time, the decision step 604 will be answered in the negative and the module assumes that the master has ceased to operate. This is a stack interrupt event which results in the transition of the module to Contention mode at a step 608, and as indicated by arrow N in the state diagram 300 of FIG. 3. Slave mode is completed at 610.

Figure 7:
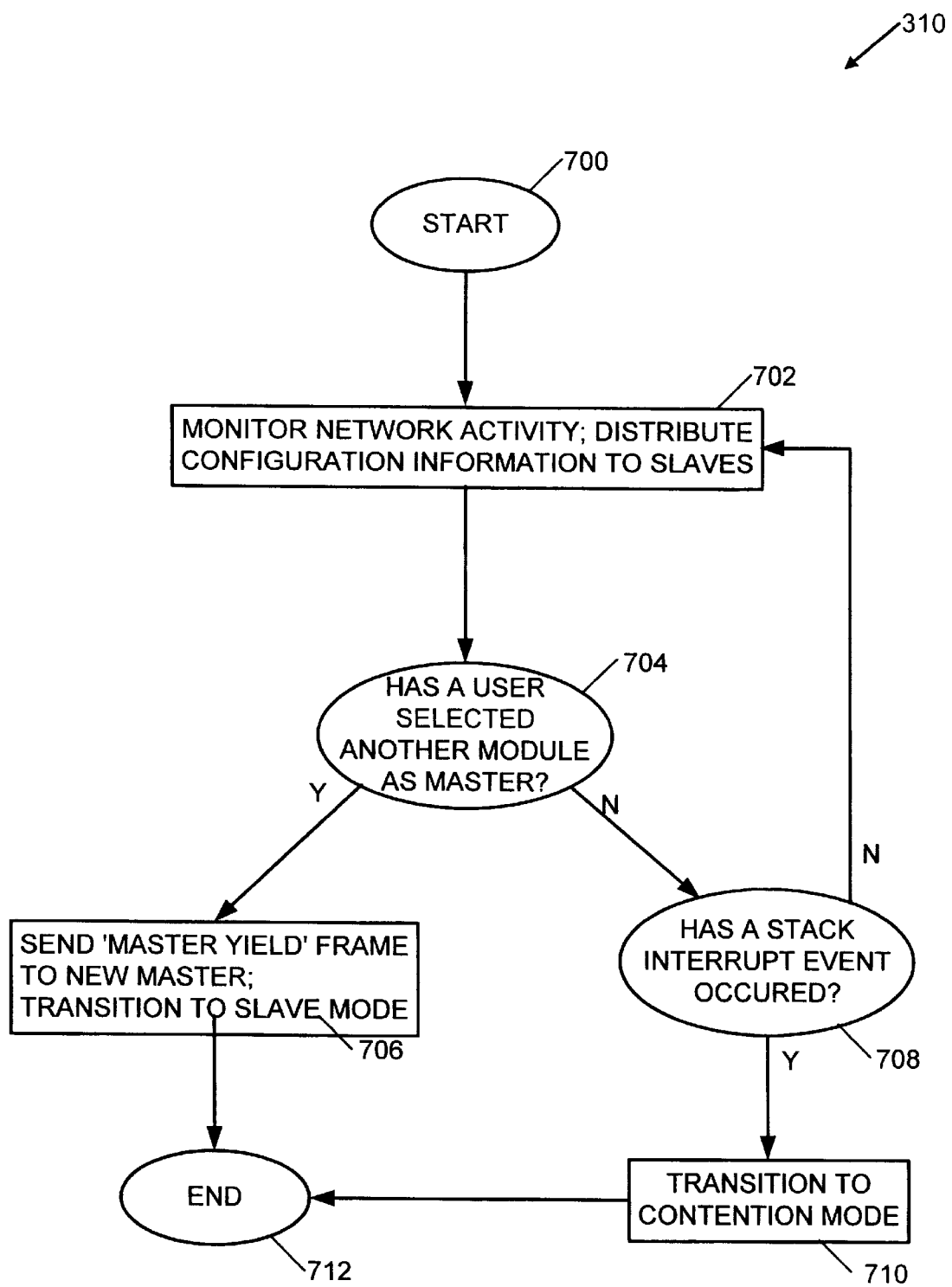
FIG. 7 depicts a process flow chart of a preferred embodiment of the Selection Master mode represented by the Selection Master state of FIG. 3.

FIG. 7 provides a process flow for a module operating in Selection Master mode, represented by Selection master state 310 in FIG. 3. The Selection Master is responsible for handling all management activities for the stack. This management feature of the Selection master is represented by a step 702 in FIG. 7. For example, the master module monitors and coordinates all communication between work stations on the network, sends alerts to a system administrator when appropriate, and monitors and controls the status of I/O ports for all management modules. An important management function of the Selection Master is the distribution of configuration parameters. The Selection Master distributes its configuration image to the slave modules in the stack by broadcasting, that is sending a frame of information to all modules on the management bus, a configuration frame. Slave modules receiving configuration a frame extract the configuration information from the frame and store the new information in their local configuration databases. The Selection Master distributes configuration frames if any one of the following events occurs: 1) an NMM transitions to the Selection Master state in a stack containing more than one NMM; 2) a new NMM is detected in the stack by the current Selection Master; and 3) the user modifies one or more of the current Selection Master's configuration parameters. In this way, the slave modules maintain a current configuration so that they are able to seamlessly transition to master mode, if necessary.

The Selection Master will transition out of this mode only in the event of intervention by a user selecting another module as Selection Master, for example, through a management console or SNMP, or the occurrence of a stack interrupt. In this event, decision step 704 is answered in the affirmative and, as indicated by arrow P in the state diagram 300 in FIG. 3 and step 706 in FIG. 7, a user selection of another module as master results in the direct transmission of a "master yield" frame relinquishing its status from the current master module to that slave module which has been selected as master and a transition of the Selection Master to Slave mode.

If no user selection of an alternate master is detected, decision step 704 is answered in the positive and the Selection Master retains its status. At a decision step 708 a determination of whether or not a stack interrupt event, such as the addition or removal of a repeater unit, has occurred. If so, the module transitions into Contention mode 304, as indicated by arrow Q in FIG. 3, and step 710 in FIG. 7. If not, normal management activities continue. In should be understood that detection of a stack interrupt initiating a new Contention may occur at any time and need not follow determination of whether a user has selected an alternate module as master as in the embodiment illustrated in FIG. 7. Selection Master mode ends at 712.

The redundant management system of the present invention permits an ordered, seamless transition between network management modules in the event of module removal or failure or system software upgrades. The system avoids inadvertent system shutdowns due to management module failure and the need to shut down a network in order to replace the management module. Thus, the present invention improves the performance and reliability of networks using stacked repeaters.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A redundant network management system, comprising:
   a plurality of network management modules in a stacked repeater, including,
      a master network management module which is configured to perform network management functions, and
      at least one slave network management module which is configured to not perfonm network management functions, but which otherwise maintains the master module's configuration;
   a management bus providing a communication link between said network management modules; and
   a protocol for determining the master and slave relationships between said modules, said protocol comprising first determining provisional master and slave designations for the plurality of modules and then determining the proper non-provisional master based on pre-established master selection criteria.

2. The system of claim 1, wherein network management functions may be transferred from the master to one of the slaves without substantial disruption of network operation.

3. The system of claim 1, further comprising a stack bus capable of providing a communication link between the network management modules and other nodes of a computer network.

4. The system of claim 1, wherein said management bus is an 8-bit bus.

5. The system of claim 1, wherein said repeater stack operates from a single clock.

6. The system of claim 1, wherein said protocol further comprises:
   selecting a master module from among the plurality of management modules, said master module being configured to perform network management functions; and
   designating the remainder of the modules as slaves, said slaves being configured to not perform network management functions.

7. The system of claim 6, wherein said selection comprises:
   determining provisional master and slave designations for the plurality of modules;
   polling the provisional slave modules regarding a set of pre-established master selection criteria;
   evaluating data received from the slaves in reply to the poll; and
   determining the proper master based on the data.

8. The system of claim 7, wherein said polling, evaluating and determining are conducted by the provisional master module.

9. The system of claim 1, wherein said protocol further comprises maintaining the same configuration between the master and the slave modules during network operation.

10. The system of claim 9, wherein the same configuration is maintained between the master and the slave modules by a protocol comprising:

broadcasting the master module's configuration to the slave modules in configuration frames on the management bus whenever the master module's configuration changes; and having the slave modules adopt the broadcast master configuration.

11. The system of claim 10, wherein said broadcasting is conducted by the master module.

12. The system of claim 1, wherein said master selection criteria comprise user selection of a master, a module's software version, and a module's position in the repeater stack.

13. The system of claim 1, wherein the master selection process is reinitiated by a stack interrupt event.

14. The system of claim 1, wherein said provisional master selection comprises:

each module determining a unique poll time based on an integer value representing its position in the repeater stack and a time constant;

each module polling the management bus for management activity;

a module which does not detect management activity on the management bus during its poll time beginning to send frames on the management bus; and designating that module as provisional master.

15. An apparatus for managing a computer network, comprising:

a network management module suitable for performing network management functions for a computer network, said module configured to be connected to
a network management bus suitable for providing a communication link between a plurality of like modules, and
a stack bus suitable for providing a communication link between said module and other nodes of a computer network;

wherein said network management module is suitable for incorporation into a redundant network management system comprising:

a plurality of network management modules in a stacked repeater, including,
a master network management module which is configured to perform network management functions, and
at least one slave network management module which is configured to not perform network management functions, but which otherwise maintains the master module's configuration;

a management bus providing a communication link between said network management modules;

a stack bus capable of providing a communication link between the network management modules and other nodes of a computer network; and a protocol for determining the master and slave relationships between said modules, said protocol comprising first determining provisional master and slave designations for the plurality of modules and then determining the proper non-provisional master based on pre-established master selection criteria.

16. The apparatus of claim 15, wherein said management bus is an 8-bit bus.

17. The apparatus of claim 15, wherein said repeater stack operates from a single clock.

18. The apparatus of claim 15, wherein said protocol further comprises:

providing a stacked repeater having a plurality of network management modules linked by a management bus;

selecting a master module from among the plurality of management modules, said master module being configured to perform network management functions;

designating the remainder of the modules as slaves, said slaves being configured to not perform network management functions; and maintaining the same configuration between the master and the slave modules during network operation.

19. A method of managing a computer network, comprising:

providing a stacked repeater having a plurality of network management modules linked by a management bus;

selecting a master module from among the plurality of management modules, said master module being configured to perform network management functions, wherein said selecting comprises first determining provisional master and slave designations for the plurality of modules and then determining the proper non-provisional master based on pre-established master selection criteria;

designating the remainder of the modules as slaves, said slaves being configured to not perform network management functions; and maintaining the same configuration between the master and the slave modules during network operation.

20. A computer network management system, comprising:

a stacked repeater having a plurality of network management modules, said plurality of network management modules including a master network management module which is configured to perform network management functions and at least one slave network management module which is configured to not perform network management functions, but which otherwise maintains the master module's configuration;

a management bus connected to provide a communications link between said management modules; and a protocol for determining the master and slave relationships between said modules, said protocol comprising:
selecting a provisional master module from among the plurality of management modules based a module's position in the repeater stack;
provisionally designating the remainder of the modules as slaves;
polling the provisional slave modules regarding a set of pre-established master selection criteria;
evaluating data received from the slaves in reply to the poll;
selecting the proper master to perform network management functions based on the poll data;
designating the remainder of the modules as slaves; and
maintaining the same configuration between the master and the slave modules;

wherein the network management functions may be transferred from the proper master to one of the slave modules without substantial disruption of network services.

21. The system of claim 20, wherein said polling, evaluating and selecting are conducted by the provisional master module.

22. The system of claim 20, wherein said master selection criteria comprise user selection of a master, a module's software version, and a module's position in the repeater stack.

23. The system of claim 20, wherein the master selection process is reinitiated by a stack interrupt event.

24. The system of claim 20, wherein said provisional master determination comprises:

each module determining a unique poll time based on an integer value representing its position in the repeater stack and a time constant;

each module polling the management bus for management activity;

a module which does not detect management activity on the management bus during its poll time beginning to send frames on the management bus; and designating that module as provisional master.

25. The system of claim 20, wherein the network management modules are configured to maintain the same configuration between the master and the slave modules by a method comprising:

broadcasting the master module's configuration to the slave modules in configuration frames on the management bus whenever the master module's configuration changes; and having the slave modules adopt the broadcast master configuration.

26. The system of claim 25, wherein the master module is configured to conduct said broadcasting.

27. A computer network management system, comprising:

a plurality of network management modules in a stacked repeater, including, a master network management module which is configured to perform network management functions, and at least one slave network management module which is configured to not perform network management functions, but which otherwise maintains the master module's configuration;

a management bus providing a communication link between said network management modules; and means for determining the master and slave relationships between said modules, wherein said means first determines provisional master and slave designations for the plurality of modules and then determines the proper non-provisional master based on pre-established master selection criteria.

28. A redundant network management system, comprising:

a plurality of network management modules in a stacked repeater, including, a master network management module which is configured to perform network management functions, and at least one slave network management module which is configured to not perform network management functions, but which otherwise maintains the master module's configuration;

a management bus providing a communication link between said network management modules;

a stack bus capable of providing a communication link between the network management modules and other nodes of a computer network; and a protocol for determining the master and slave relationships between said network management modules wherein said protocol comprises:

determining provisional master and slave designations for the plurality of modules based a module's position in the repeater stack;

selecting a proper non-provisional master network management module based on pre-established master selection criteria;

designating said proper non-provisional master network management module as the master network management module designating the remainder of the modules as slaves; and maintaining the same configuration between the master and the slave modules during network operation;

wherein network management functions may be transferred from the master to one of the slaves without substantial disruption of network operation.

29. The system of claim 28, wherein said selecting is conducted by the provisional master module.

30. The system of claim 28, wherein said selecting comprises:

polling the provisional slave modules regarding a set of pre-established master selection criteria;

evaluating data received from the slaves in reply to the poll; and determining the proper master based on the data.

31. The system of claim 30, wherein said master selection criteria comprise user selection of a master, a module's software version, and a module's position in the repeater stack.

32. The system of claim 28, wherein the master selection process is reinitiated by a stack interrupt event.

33. The system of claim 28, wherein determining said provisional master comprises:

each module determining a unique poll time based on an integer value representing its position in the repeater stack and a time constant;

each module polling the management bus for management activity;

a module which does not detect management activity on the management bus during its poll time beginning to send frames on the management bus; and designating that module as provisional master.

34. The system of claim 28, wherein the same configuration is maintained between the master and the slave modules by a protocol comprising:

broadcasting the master module's configuration to the slave modules in configuration frames on the management bus whenever the master module's configuration changes; and having the slave modules adopt the broadcast master configuration.

35. The system of claim 34, wherein said broadcasting is conducted by the master module.

36. An apparatus for managing a computer network, comprising:

a network management module suitable for performing network management functions for a computer network, said module configured to be connected to:

a network management bus suitable for providing a communication link between a plurality of like modules, and a stack bus suitable for providing a communication link between said module and other nodes of a computer network;

wherein said network management module is suitable for incorporation into a redundant network management system including:

a plurality of network management modules in a stacked repeater, including:

a master network management module which is configured to perform network management functions, and at least one slave network management module which is configured to not perform network management functions, but which otherwise maintains the master module's configuration;

a management bus providing a communication link between said network management modules;

a stack bus capable of providing a communication link between the network management modules and other nodes of a computer network; and a protocol for determining the master and slave relationships between said modules wherein said protocol comprises:

selecting includes determining a provisional master and slave designations for said modules;

designating a proper non-provisional master for said modules based on pre-established master selection criteria;

designating the remainder of the modules as slaves; and maintaining the same configuration between the master and the slave modules during network operation.

37. The apparatus of claim 36, wherein selecting a master module from among the plurality of management modules includes determining provisional master and slave designations for the plurality of modules based a module's position in the repeater stack, polling the provisional slave modules regarding a set of pre-established master selection criteria, evaluating data received from the slaves in reply to the poll, and determining the proper master based on the data.

38. The apparatus of claim 37, wherein said polling, evaluating, and determining are conducted by the provisional master module.

39. An apparatus for managing a computer network, comprising:

a network management module suitable for performing network management functions for a computer network, said module configured to be connected to:

a network management bus suitable for providing a communication link between a plurality of like modules, and a stack bus suitable for providing a communication link between said module and other nodes of a computer network;

wherein said network management module is suitable for incorporation into a redundant network management system including:

a plurality of network management modules in a stacked repeater, including:

a master network management module which is configured to perform network management functions, and at least one slave network management module which is configured to not perform network management functions, but which otherwise maintains the master module's configuration;

a management bus providing a communication link between said network management modules;

a stack bus capable of providing a communication link between the network management modules and other nodes of a computer network; and a protocol for determining the master and slave relationships between said modules comprising:

selecting a provisional master module from among the plurality of management modules based a module's position in the repeater stack;

provisionally designating the remainder of the modules as slaves, said slaves being configured to not perform network management functions;

polling the provisional slave modules regarding a set of pre-established master selection criteria;

evaluating data received from the slaves in reply to the poll;

selecting the proper master to perform network management functions based on the poll data;

designating the remainder of the modules as slaves; and maintaining the same configuration between the master and the slave modules;

wherein the network management functions may be transferred from the proper master to one of the slave modules without substantial disruption of network services.

40. The apparatus of claim 39, wherein said polling, evaluating and selecting are conducted by the provisional master module.

41. The apparatus of claim 39, wherein said master selection criteria comprise user selection of a master, a module's software version, and a module's position in the repeater stack.

42. The apparatus of claim 39, wherein the master selection process is reinitiated by a stack interrupt event.

43. The apparatus of claim 39, wherein said provisional master selection comprises:

each module determining a unique poll time based on an integer value representing its position in the repeater stack and a time constant;

each module polling the management bus for management activity;

a module which does not detect management activity on the management bus during its poll time beginning to send frames on the management bus; and designating that module as provisional master.

44. The apparatus of claim 39, wherein the same configuration is maintained between the master and the slave modules by a protocol comprising:

broadcasting the master module's configuration to the slave modules in configuration frames on the management bus whenever the master module's configuration changes; and having the slave modules adopt the broadcast master configuration.

45. The apparatus of claim 44, wherein said broadcasting is conducted by the master module.

* * * * *